United States Patent [19]
Donges et al.

[11] 3,720,836
[45] March 13, 1973

[54] PROTECTION FROM LASER RADIATION

[75] Inventors: Ernst Donges, Westheim bei Augsburg; Fritz Wagner, Gersthofen bei Augsburg, both of Germany

[73] Assignee: Sigri Elektrographit GmbH, Meitingen, Germany

[22] Filed: March 12, 1971

[21] Appl. No.: 123,589

[30] Foreign Application Priority Data

April 7, 1970 Germany..................P 20 16 452.7

[52] U.S. Cl................................................250/108 FS
[51] Int. Cl.................................................G21f 1/12
[58] Field of Search......250/108 R, 108 WS, 108 FS; 331/94.5; 219/121 L, 121 LM

[56] References Cited

UNITED STATES PATENTS

| 3,553,421 | 1/1971 | Schawlow | 219/121 L |
| 3,492,072 | 1/1970 | Haun, Jr. | 331/94.5 X |
| 3,464,534 | 9/1969 | Muncheryan | 331/94.5 X |

OTHER PUBLICATIONS

Laser Beam Absorber by Dean, from IBM Technical Disclosure Bulletin, Vol. 12, No. 12, May 1970, p. 2131

*Primary Examiner*—Archie R. Borchelt
*Attorney*—Curt M. Avery, Arthur E. Wilfond, Herbert L. Lerner and Daniel L. Tick

[57] ABSTRACT

For protection from laser radiation, a shielding material composed of a sheaf of fabric-like, flexible graphite foils is placed between the radiation source and the object to be shielded.

8 Claims, 2 Drawing Figures

FIG.1
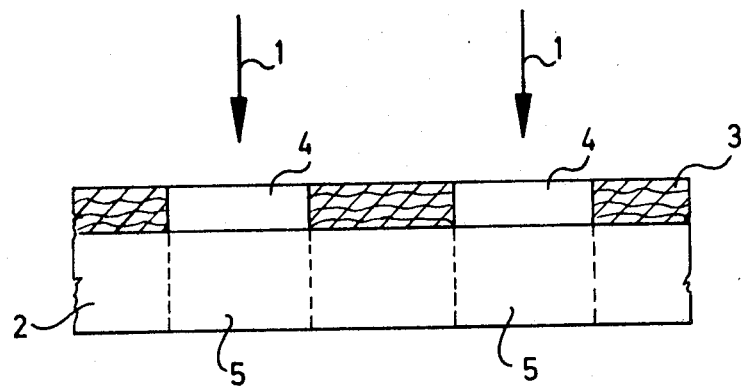
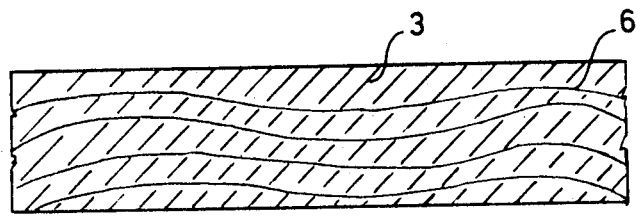
FIG.2

PROTECTION FROM LASER RADIATION

Our invention relates to the protective shielding of objects from continuous or pulsed laser radiation.

In contrast to other sources of energy, lasers emit the entire energy within an extremely minute opening angle. By focusing the coherent radiation with the aid of suitable optical devices, the energy density can be further increased, and it has been possible to already attain energy densities larger by the factor $10^8$ than the energy densities maximally attained with sun radiation. For that reason, lasers are suitable not only for communication purposes but also for the processing of solid materials, for example welding, cutting, boring and the like.

The energy densities of laser radiation above $10^7$ W/cm$^2$ afford heating limited areas of workpieces to such extremely high temperatures that the workpiece material will vaporize explosively. On the other hand, the extreme energy density makes it difficult to protect personnel, tools, apparatus and the like from inadvertent or intentionally applied laser radiation. The protective means heretofore known for shielding from laser radiation consist of high-melting metals or ceramic materials in the form of rigid walls which are difficult to manipulate on account of their large weight and are hardly, if at all, suitable for the protection of moving objects.

It is an object of our invention, therefore, to protect personnel, tools, apparatus and the like from laser irradiation with the aid of non-rigid low-weight equipment.

To this end, and in accordance with our invention, we employ as effective shield for protection from laser radiation, a material consisting of a sheaf or bunch of flexible graphite foils, or blankets or suits made of such composite graphite foil material.

The surprising effect of shielding means according to the invention is probably due to the fact that the graphite-foil material, when in use, has its foils extended in a generally parallel direction to the surface to be protected so that, as a consequence of the anisotropy of graphite foils, the energy transmitted in the focal or burning point of the laser beam is dissipated predominantly in a direction parallel to the foil surfaces, whereby the remaining energy density is no longer sufficient to vaporize carbon. This anisotropy of graphite foils is manifested by the fact that the heat conductivity at normal room temperature (20°C) is 10 to 20 W/sec grd. The amount of 10 to 20 relates to the heat conductivity in a direction perpendicular to the foil plane is less than 0.1 W/sec grd.

According to another feature of our invention, relating to the machining of workpieces, the surface of the workpiece to be exposed to laser radiation is covered with a shielding material consisting of flexible graphite foils, the material having perforations or openings so as to form a mask. Consequently, only the workpiece areas located beneath the perforations are removed by the energy of the laser irradiation subsequently applied.

The flexible graphite foils in material according to the invention consist preferably of expanded graphite which is pressed to foil shape without the use of a binder. Preferably such a binder-free, pressed graphite material is reinforced by embedded fibers or fabrics of graphite.

The accompanying drawing will further elucidate the invention by exemplifying two embodiments.

FIG. 1 shows schematically and in section a workpiece shielded with perforated graphite foil material; and FIG. 2 illustrates schematically and in section an individual foil of graphite.

According to FIG. 1, a workpiece of any metal to be simultaneously provided with a number of holes is subjected to laser radiation diagrammatically represented by arrows 1. The irradiated surface of the workpiece 2 is covered by shielding material 3 which consists of a mass of substantially parallel graphite foils an is perforated at the localities 4 where the laser radiation is to act upon the workpiece 2. As a consequence, the workpiece is vaporized only along the portions 5 located beneath the perforations 4.

As explained and as schematically shown in FIG. 2, the shielding material 3 is preferably reinforced by embedded fibers or fabrics 6 also consisting of graphite.

It is an outstanding advantage of the invention that the protective shielding material can readily be adapted to the shape of the objects to be protected, namely, simply by bending the foil material in accordance with that shape. Furthermore, the protection of moving objects, including humans, is achieved by light-weight covers, blankets or suits. When using masks according to the invention for the processing of workpieces with laser radiation, the amount of time required for the work, particularly for adjusting the laser arrangement, is considerably reduced.

Described in the following are examples concerning the composition and production of the shielding material according to the invention.

Natural graphite having an average grain size of 0.1 mm, upon being treated with nitric acid, was expanded by short-lasting heating to about 800°C. Thereafter the pulverulent material was pressed and shaped into foils upon a roller mill, producing a foil thickness of 0.1 to 5 mm. This was done without any addition of binding agents. The flexible foils thus obtained were cut to the shape of rectangular configuration and irradiated with laser light. When using a continuous carbon dioxide laser, a time of approximately 3 seconds was needed for perforating a foil of 0.1 mm thickness, using a laser whose power output was 100 W and whose focal or burning point had a diameter of approximately 1 mm. Foils of 2 mm thickness could not be perforated with this same laser equipment.

Other foils were irradiated with a ruby laser, furnishing a pulsed energy of 40 kW. The perforating of a foil having a thickness of 2 mm required 3 to 5 pulses. However, no holes could be made with this equipment in foils of 5 mm thickness. After the radiation, the thicker foils only exhibited relatively small bubble-shaped bulges at the surface.

Thereafter, a foil of 5 mm thickness was perforated with the aid of a fine needle, then arranged on a bearing jewel of ruby, and again irradiated with the same laser. As a result, the ruby evaporated along a line in the extension of the bore. The resulting hole in the ruby exhibited a smooth surface precisely corresponding to the bore diameter.

For the protection of relatively large workpieces and equipment, it has been found preferable to mechanically reinforce the foils by embedded graphite fibers or graphite fabrics as described above with reference to FIG. 2. Reinforced foils for the purpose of the invention can be produced as follows. The embedded material consisting of graphite fibers or fabrics is coated with synthetic plastic, for example furan resins or phenol formaldehyde resins. Then a layer of this material is placed upon expanded graphite into which the fiber material is to be embedded. Preferably, both sides of the embedded material are covered with the pulverulent, expanded graphite. The material is then pressed or rolled, preferably from both sides, to produce the shielding material.

To those skilled in the art it will be obvious from a study of this disclosure that our invention permits of various modifications, without departing from the essential features of the invention and within the scope of the claims annexed hereto.

We claim:

1. The method of protecting from laser radiation, which comprises shielding a laser-radiation exposed object by interposing, between the laser source and the object, a fabric-like shielding material composed of flexible graphite foils.

2. The method of protecting from laser radiation, which comprises enveloping a laser-radiation exposed object in a flexible composite envelope material consisting essentially of a fabric composed of an assembly of substantially parallel graphite foils.

3. The method of working a workpiece by laser irradiation, which comprises covering the laser-radiation exposed surface of the workpiece with a perforated shielding material composed of flexible graphite foils which extend substantially parallel to the workpiece surface; and irradiating the covered workpiece through the perforation of the shielding material.

4. A shielding material for protection from laser radiation, consisting substantially of a sheaf of flexible graphite foils arranged in layers transverse to the direction of laser radiation and substantially impermeable thereto.

5. In a laser-radiation shielding material according to claim 4, said sheaf having at least one perforation and, when in operation, being placed on top of a workpiece to be laser-processed through the perforation.

6. In a laser-radiation shielding material according to claim 4, said flexible foils consisting of binder-free, compressed and expanded graphite material.

7. In a laser-radiation shielding material according to claim 6, said flexible graphite foils being reinforced by embedded fibers of graphite.

8. In a laser-radiation shielding meterial according to claim 6, said flexible graphite foils being reinforced by embedded fabrics of graphite fibers.

* * * * *